United States Patent
Boersma

(10) Patent No.: US 11,609,173 B2
(45) Date of Patent: Mar. 21, 2023

(54) PARTICLE DETECTION DEVICE AND A METHOD FOR DETECTING AIRBORNE PARTICLES

(71) Applicant: Nederlandse Organisatie voor toegepast-natuurwetenschappelijk onderzoek TNO, s-Gravenhage (NL)

(72) Inventor: Arjen Boersma, Haaren (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 367 days.

(21) Appl. No.: 16/633,445

(22) PCT Filed: Jul. 26, 2018

(86) PCT No.: PCT/NL2018/050523
§ 371 (c)(1),
(2) Date: Jan. 23, 2020

(87) PCT Pub. No.: WO2019/022607
PCT Pub. Date: Jan. 31, 2019

(65) Prior Publication Data
US 2020/0217771 A1     Jul. 9, 2020

(30) Foreign Application Priority Data
Jul. 27, 2017  (EP) .................... 17183570

(51) Int. Cl.
*G01N 15/02* (2006.01)
*B01L 3/00* (2006.01)
(Continued)

(52) U.S. Cl.
CPC ...... *G01N 15/0266* (2013.01); *B01L 3/50273* (2013.01); *B01L 3/502707* (2013.01);
(Continued)

(58) Field of Classification Search
CPC ..... B01L 2200/0668; B01L 2300/0627; B01L 2300/0816; B01L 2400/088;
(Continued)

(56) References Cited

U.S. PATENT DOCUMENTS

2010/0186524 A1  7/2010  Ariessohn et al.
2011/0072772 A1  3/2011  Ariessohn et al.
(Continued)

FOREIGN PATENT DOCUMENTS

CN     105651643 A     6/2016
DE  102007039566 A1    2/2009
(Continued)

OTHER PUBLICATIONS

Mingzhi Dong et al., "Integrated Virtual Impactor Enabled PM$_{2.5}$ Sensor," IEEE Sensors Journal, vol. 17, No. 9, pp. 2814-2821 (May 1, 2017).
(Continued)

*Primary Examiner* — Jennifer Wecker
(74) *Attorney, Agent, or Firm* — Leydig, Voit & Mayer, Ltd.

(57) ABSTRACT

The invention relates to a particle detection device and a method for detecting particles in a fluid by means of separation. A channel structure is arranged for separating an incoming flow into a major flow comprising a minor portion of particles above the first predetermined size and a minor flow comprising a major portion of particles above the predetermined size. One or more detectors are arranged for detecting particles in the major flow and minor flow. The channel structure further comprises a choked flow restriction arranged for enabling a constant flow independent of pressure conditions.

20 Claims, 8 Drawing Sheets

(51) Int. Cl.
*G01N 1/22* (2006.01)
*G01N 1/24* (2006.01)
*G01N 15/00* (2006.01)

(52) U.S. Cl.
CPC ... *B01L 3/502746* (2013.01); *B01L 3/502761* (2013.01); *G01N 1/2202* (2013.01); *G01N 1/2247* (2013.01); *G01N 1/24* (2013.01); *B01L 2200/0647* (2013.01); *B01L 2200/12* (2013.01); *B01L 2300/0627* (2013.01); *B01L 2300/16* (2013.01); *B01L 2400/0475* (2013.01); *B01L 2400/082* (2013.01); *G01N 2001/245* (2013.01); *G01N 2015/0046* (2013.01)

(58) Field of Classification Search
CPC .......... B01L 3/502707; B01L 3/50273; B01L 3/502746; B01L 3/502761; B01L 2200/0647; B01L 2200/12; B01L 2300/16; B01L 2400/0475; B01L 2400/082; G01N 1/2202; G01N 1/2208; G01N 1/2247; G01N 1/2273; G01N 1/24; G01N 15/0255; G01N 15/0266; G01N 2001/2223; G01N 2001/244; G01N 2001/245; G01N 2015/0046
See application file for complete search history.

(56) References Cited

U.S. PATENT DOCUMENTS

| | | | | |
|---|---|---|---|---|
| 2012/0174650 | A1* | 7/2012 | Ariessohn | G01N 1/2202 73/23.2 |
| 2013/0309778 | A1* | 11/2013 | Lowe | B01L 3/527 422/69 |
| 2014/0031263 | A1* | 1/2014 | Norling | G01N 1/405 506/35 |
| 2014/0123730 | A1 | 5/2014 | Yamasaki et al. | |
| 2017/0128940 | A1* | 5/2017 | Amini | B01L 3/502776 |

FOREIGN PATENT DOCUMENTS

| | | | | |
|---|---|---|---|---|
| DE | 102008041809 A1 | | 3/2010 | |
| EP | 2455774 A1 | * | 5/2012 | ......... G01N 15/0656 |
| EP | 2573540 A1 | * | 3/2013 | ........ B01L 3/502746 |
| JP | 2008-224332 A | | 9/2008 | |
| WO | WO-2010026423 A2 | * | 3/2010 | ............. B01D 45/06 |
| WO | WO-2012075527 A1 | * | 6/2012 | ......... B01D 11/0496 |
| WO | WO 2014153142 A1 | | 9/2014 | |
| WO | WO 2016065465 A1 | | 5/2016 | |

OTHER PUBLICATIONS

European Patent Office, International Search Report in corresponding International Application No. PCT/NL2018/050523, dated Dec. 21, 2018 (3 pages).

Zhao et al., "Airborne particulate matter classification and concentration detection based on 3D printed virtual impactor and quartz crystal microbalance sensor," *Sensors and Actuators A*, 238:379-388 (2016).

Paprotny et al., "Microfabricated air-microfluidic sensor for personal monitoring of airborne particulate matter: Design, fabrication, and experimental results," *Sensors and Actuators A*, 201:506-516 (2013).

European Patent Office, European Examination Report in corresponding European Application No. 18766368.7, dated May 18, 2022 (13 pages).

* cited by examiner

PARTICLE DETECTION DEVICE AND A METHOD FOR DETECTING AIRBORNE PARTICLES

CROSS-REFERENCE TO RELATED APPLICATIONS

This patent application is a U.S. National Phase of PCT International Application No. PCT/NL2018/050523, filed Jul. 26, 2018, which claims priority to European Application No, 17183570.5, filed Jul. 27, 2017, which are both expressly incorporated by reference in their entireties, including any references contained therein.

FIELD OF THE INVENTION

The invention relates to a particle detection device and method for detecting airborne particles. The invention also relates to a particle detection system and a channel structure for use in the particle detection device.

BACKGROUND TO THE INVENTION

Particle detecting devices are widely used for measuring and/or detecting particulate matter or airborne particles in a fluid. Such devices may for example be used for detecting dust, pollution, contaminants, etc. in air or other fluid streams. Typically, larger devices are employed for accurately indicating the different fractions of particles in air. Relatively small or miniaturized devices typically utilize low-cost sensors providing a fairly poor accuracy. As a result, the device may for instance not be able to detect the particles and/or accurately distinguish the size of the particles. There is a need to increase the accuracy of the particle detection devices, especially for smaller or miniaturized particle detecting/measuring devices or systems.

The particle detecting device may include a plurality of micro-channels through which air is guided. The air can be drawn into the particle detecting device by means of a pump or fan. Inside the micro-channels the particles may be sorted in different channels depending on their size.

As a result of miniaturization of a particle detection device, the design of the pump needs to be compact. However, the pump typically plays a defining role in the design of flow channels inside the particle detection device, restricting the overall design of freedom. Moreover, pressure fluctuations in the channels resulting from the operation of the pump can influence the detection of particles, possibly influencing the accuracy of the device.

The detection of the particles in the channels by means of a sensor may require the ability to control the flow in the micro-channels at least to some extent. Typically, a relatively accurate control is required for obtaining accurate particle detection. A pump may not be able to provide for a proper control over the flow inside the channels of the particle detection device. Moreover, pumps which can provide an accurate control of the flow inside the micro-channels may be expensive and/or have large dimensions, making them for example unsuitable for use in portable and/or miniaturized devices. Cheaper pumps used in low-cost particle detecting devices or miniaturized pumps used in portable particle detecting devices may not provide sufficient ability to control the flow inside (micro-)channels or may be rather instable during use.

There is a strong need for a particle detecting device which is less dependent on the specifications of the pump or fan used and which can, additionally or alternatively, operate using different types of pumps, for example having different characteristics.

SUMMARY OF THE INVENTION

It is an object of the invention to provide for a device and a method that obviates at least one of the above-mentioned drawbacks.

Alternatively or additionally, it is an object of the invention to provide a miniaturized particle detection device with improved accuracy for detecting particles.

Alternatively or additionally, it is an object of the invention to provide for a particle detection device and a method for detecting airborne particles with improved control of the flow passing through the device.

Alternatively or additionally, it is an object of the invention to provide for a particle detection device and a method for detecting airborne particles which is less dependent or independent of the specifications and/or characteristics of a pump or fan used for directing a fluid/gas through the particle detection device.

Thereto, the invention provides for a particle detection device, including a channel structure arranged for detecting airborne particles in a fluid stream by means of separation. The channel structure forms a fluid flow passage extending from an inlet to an outlet. The fluid flow passage comprises a plurality of flow channels arranged between an inlet flow channel connected to the inlet and an outlet flow channel connected to the outlet. The particle detection device is connectable to a receiving device comprising a pump or fan for enabling a fluid stream through the fluid flow passage of the channel structure. The inlet flow channel extends from the inlet to a first separation portion arranged for branching off the inlet flow channel into at least one main flow channel and at least one side flow channel. The first separation portion is arranged to separate the fluid stream into a minor flow in the at least one main flow channel and a major flow in the at least one side flow channel. The minor flow in the at least one main flow channel comprises a major portion of particles above a first predetermined size, and the major flow in the at least one side flow channel comprises a minor portion of particles above the first predetermined size. At least one of the at least one main flow channel or at least one side flow channel comprises one or more detectors arranged for detecting particles. The at least one of the plurality of flow channels includes a choked flow restriction arranged to provide a choked flow, in use, for enabling a constant flow in the fluid flow passage, independent of pressure conditions.

The choked flow restriction/restrictor in the channel structure can be arranged to cause a choked flow in the channel structure of the particle detection device. An advantage of choked flow (of gases) is that the mass flow rate is relatively independent over a pressure working range of the downstream pressure (where for example the pump or fan is arranged), and depends only weakly on the temperature and pressure and hence the density of the gas on the upstream side of the choked flow restriction. The mass flow rate may be primarily dependent on the cross-sectional area or hydraulic diameter of the choked flow restriction and the pressure upstream of the choked flow restriction. The mass flow rate does not depend on the downstream pressure at all. All other influencing parameters are constants and depend only on the composition of the material in the flow.

Optionally, the mass flow rate is substantially independent over a pressure working range between 0-0.5 bar, for example when the upstream pressure is substantially atmospheric (I bar).

The choked flow restriction may determine the flow through fluid passage of the particle detection device. Advantageously, the choked flow restriction enables a substantially constant flow through the fluid passage of the channel structure of the particle detection device. In this way, it is possible to design the particles detection device and/or its channel structure independently from the pump or fan utilized for guiding a fluid or gas through the particle detection device. Moreover, this can lead to more design freedom as the particle detection device may be used with pumps having different characteristics. Various pumps can be used while maintaining the needed accuracy. The cost price of the detection device can be reduced. Furthermore, the detection accuracy and the robustness of the particle detection device can be improved. Alternatively or additionally, since smaller pumps can be employed, miniaturization of the measurement system including the particle detection device can be facilitated.

By means of integrated or embedded detectors inside one or more channels of the channel structure, particles can be detected and/or measured on-line and on-site. This is also beneficial for miniaturization of the particle detection device. In an advantageous example, the particle detection device is a miniaturized portable device.

The channel structure may include a plurality of channels through which a fluid flows which carries substantially particles with different properties and/or features. Different types of particles may also be detected/measured by the detectors. It is also envisaged to detect particles having a substantially different size, form, mass, weight, shape, density, etc. Many types of categorization of particles can be employed. For example, particles being substantially round-shaped or spherical can be distinguished from particles being substantially elongated. The elongated particles can behave as spherical particles with an effective larger diameter. Such information may for instance be of great importance for determining the impact of the particles on health. Elongated particles may, for example, indicate the presence of asbestos, which is proven to be very dangerous to health.

The particles may self-orient in the fluid stream inside a channel of the channel structure of the particle detection device. This can be achieved by changing the flow rate by changing the hydraulic diameter of the choked flow restriction. Fiber-shaped particles may behave differently compared to spherical particles. The separation portion inside the channel structure may be arranged in such a way that elongated or fiber-shaped particles (e.g. for the detection of asbestos) tend to go straight into the main flow channel of the separation portion and the spherical particles are mostly drawn to the side flow channel of the separation portion. The fiber-shaped particles can have a relatively large mass relative to the effective surface compared to for instance spherical particles. An elongated particle may orient itself in the flow, which means that the drag can be decreased. Hence it can behave as a round particle with a higher mass in the fluid stream.

Other particle features may also be important depending on the application in which the device is used. Depending on the detectors, other properties of the particles guided through a channel of the channel structure can be detected and/or measured. The detectors may also be used to determine velocity of particles or a flow in a channel.

Air may be sucked or pumped through the fluid passage by means of a pump or a fan. Many types of pumps and fans can be employed since the choked flow restriction can enable a substantially constant flow through the fluid passage of the channel structure of the particle detection device, making the flow substantially independent of pressure conditions at least in a certain operational range of the pump or fan. A choked flow is a compressible flow effect known in the art. The fluid velocity can become choked or limited. The choked flow can be generated by the limitation of a maximum air flow at the speed of sound through a small diameter orifice. For example, for single temperature and pressure conditions, an approximation of the hydraulic diameter (D) as a function of flow rate (Q) can be given by D [mm] $\approx 1.33 \cdot 10^{-2} \sqrt{Q}$ [ml/min]. Other approximations are also possible.

It is appreciated that other mass transferring means may also be employed for actively directing air/gas through the particle detection device. In an alternative example, air may be guided through the particle detection device passively. For example, as a result of the movement of the person or unit carrying the particle detection device, air may be automatically drawn into the device for detection, measurement and/or analysis of airborne particles.

It is observed that for particles encountering the separation portion branching off in the side flow channel and the main flow channel, smaller particles tend to flow through a side flow channel in the channel structure, while the larger particles tend to flow through a main flow channel in the channel structure. This is mainly due to the fact that the smaller particles may bend more easily to the side flow channel, and the larger particles may tend to go straight, which is also conventionally known as a virtual impactor. Different flow channels can be obtained including substantially particles with specific characteristics or properties. Inside the channels the presence and/or properties of the particles can then be measured by means of one or more detectors. Many variations in a channel structure design is possible for the particle detection device.

Micro-fluid channels or micro-channels can be arranged in the channel structure for separating particles into two or more fractions inside a miniaturized particle detection device.

A virtual impactor can be utilized for separation of a flow inside a channel into a branched off major flow channel and a branched off minor flow channel. The channel may be branched off in a larger number of major and/or minor flow channels. A virtual impactor may comprise a network of (micro-) channels through which air can be directed, for example by use of a pump, fan or the like. In an example the channel structure forms or comprises a plurality of virtual impactors.

The channel structure or virtual impactor of the particle detection device can be manufactured through micro/nano manufacturing. The precise dimensions of the channels of the channel structure in combination with the flow rate of the gas inside the channel structure determine how the particles is separated.

The particle detection device may be used to detect an indication for the size of airborne particles, to detect specific fraction of particulate matter, and/or to distinguish between particulate form (spherical, bar/elongated shaped, etc.), chemistry (by optical waveguides). Advantageously, the detection can be carried out in real-time since the one or more detectors are integrated and/or embedded inside the channel structure of the particle detection device.

Optionally, a cascade of separation portions or virtual impactors are arranged in the channel structure. Such a cascade may be arranged for obtaining an increased number of channels into which particles substantially having different properties (size, shape, etc.) can be separated.

Optionally, the choked flow restriction is dimensioned to provide a substantially constant flow in the range of 5 to 500 ml/min, more preferably 20 to 300 ml/min. Advantageously, by means of the flow restriction, such a (substantially constant) flow can be obtained regardless of the pressure difference for instance as a result of the operation of the means of guiding air through the fluid flow passage of the channel structure (e.g. pump or fan). The particle detection device may have a range of operation in which the flow can be kept substantially constant independent of pressure conditions. The pressure difference between atmospheric pressure (~1 bar absolute) at the inlet, and an under pressure at the outlet (0-0.5 bar absolute) may be in the range of 0.5-1 bar. Advantageously, this range is sufficiently large such as to provide sufficient freedom of choice in selecting a pump or fan. In this way, smaller/cheaper pumps can be utilized for instance.

The channel structure may have a network of channels having relatively small dimensions, such as for example in the range of 0.1-5 millimeters in hydraulic diameter. Inside the channel structure, particles can be separated by size (and/or shape).

Preferably, the choked flow restriction is arranged in the outlet flow channel. The at least one main flow channel and the at least one side flow channel of the channel structure may be in fluid communication with an outlet flow channel connected to the outlet.

Optionally, a pump or fan is arranged in fluid connection with the outlet flow channel. The pump or fan may be configured to suck air through the outlet flow channel.

Optionally, the choked flow restriction, also known as a 'critical orifice' is arranged in the inlet flow channel.

Optionally, the choked flow restriction is a critical orifice.

Optionally, the choked flow restriction is obtained by means of a channel constriction having a hydraulic diameter of 50 to 300 micrometer. The choked flow restriction can be a relative thin section in a channel arranged for regulating the gas flow, regardless of the pressure drop across the inlet and the outlet of the channel structure of the particle detection device.

Optionally, all the channels of the channel structure eventually meet in the outlet flow channel. However, it may also be possible to provide a plurality of outlet flow channels connected to the outlet (for example arranged in parallel).

Optionally, the choked flow restriction is a throat of a convergent-divergent nozzle. In an alternative example, a valve in a channel is used as a choked flow restriction for obtaining a choked flow.

Optionally, the particle detection device comprises means for adjusting the hydraulic diameter of the choked flow restriction. When another particle size (or shape) is to be measured, the hydraulic diameter of the choked flow restriction can be adjusted. For example, when the particles that need to be separated change from 5 to 2 micrometer, the flow rate may need to change from 50 ml/min to 100 ml/min, and the (hydraulic) diameter of the flow restriction can be increased from 100 micrometer to 130 micrometer. In this way, the particle detection device can be used for a wide range of particles to be analyzed, which can be accomplished by varying the hydraulic diameter of the choked flow restriction.

Optionally, the hydraulic diameter of the choked flow restriction is adjusted manually, for instance by adjusting a screw.

Optionally, an electric actuator is arranged for adjusting the hydraulic diameter of the choked flow restriction. The electric actuator can comprise at least one of the group including a piezoelectric actuator, electroactive polymer actuator, MEMS switch or thermal actuator.

Optionally, the hydraulic diameter of the choked flow restriction is adjusted by means of replacing a channel duct of the channel structure comprising the choked flow restriction with a first hydraulic diameter, with another channel duct comprising a second choked flow restriction with a second hydraulic diameter.

Optionally, a plurality of restriction channels are arranged in parallel each comprising a choked flow restriction, wherein fluid needs to pass through at least one of the restriction channels to form the fluid flow passage. The hydraulic diameter of the choked flow restriction can be adjusted by selecting one or more of the plurality of restriction channels through which fluid passes. Optionally, one or more of the plurality of restriction channels are selected by means of a valve. Optionally, each of the plurality of restriction channels comprises a choked flow restriction with a hydraulic diameter different than that of the other restriction channels. Additionally or alternatively, it is also envisaged that fluid is allowed to pass through a channel which does not comprise a choked flow restriction such as to increase an 'effective' hydraulic diameter of parallel channels. In this way an 'effective' hydraulic diameter of the choked flow restriction of the channel structure can be adjusted.

Optionally, the channel structure comprises a plurality of separation portions.

Optionally, the channel structure comprises at least one further separation portion downstream of the first separation portion. The further separation portion is arranged for branching off the at least one main flow channel of the first separation portion or a channel connected thereto into at least one further main flow channel and at least one further side flow channel. The further separation portion is arranged to separate the fluid stream into a minor flow in the at least one further main flow channel and a major flow in the at least one further side flow channel. The minor flow in the at least one further main flow channel comprises a major portion of particles above a second predetermined size, and the major flow in the at least one further side flow channel comprises a minor portion of particles above the second predetermined size. At least one of the at least one further main flow channel or at least one further side flow channel comprises one or more detectors arranged for detecting particles. A plurality of different detectors, preferably of different types, may be used such as to obtain more information from the measurement. In an example, a plurality of different detectors are used at a substantially same channel location for enhancing the detection of particles.

The one or more detectors of the particle detection device can be made compact (miniaturized) by means of CMOS technologies and can be connected by printed electronics. Integrated silicon optics opens the possibility of in-line chemical detection.

Optionally, the one or more detectors comprise at least one of the group consisting of: a capacitive sensor, microelectromechanical systems (MEMS) sensor, a film bulk acoustic resonator (FBAR) sensor, an I-shaped bulk acoustic resonator (IBAR) sensor, a surface acoustic wave (SAW) sensor, or an optical sensor. Different detection methods can be used, wherein for example particles are separated in fractions and/or different types. Types of particles may for instance include asbestos, carbon black, silica, etc. Depending on the application, it may also be possible to expand the particle detection device with other detection methods.

The particle detection device may be arranged for providing multiple detection and/or measurement parameters.

Other sensors, such as lasers/led sensors can also be employed for detecting particles. For example, an infrared (IR) waveguide sensor can be provided for the chemical analysis of particles. A film bulk acoustic resonator sensor or surface acoustic wave sensor can be provided for the mass assessment of the particles.

Optionally, the one or more detectors comprise a digitated capacitive sensor. An interdigitated capacitive sensor may comprise two metallic comb structures of which the individual lines are positioned between two lines of the other comb structure, but do not touch. The distance between the lines can range between 0.5 and 20 micrometer, resulting in a measurable capacitance between the two combs. When a particle moves between the two combs or is immobilized on the surface of the combs, a change in capacitance is measured and translated to the presence of a particle. By changing the distance between the lines, or the position of the combs in the flow channel, particle size, shape and orientation can be derived from the resulting capacitance signal. An interdigitated capacitance sensor may be manufactured by CMOS technology (etching of metallic structures on a silicon wafer) or direct printing of metallic structures on non conductive substrates. Advantageously, such a digitated capacitive sensor can be easily integrated in a miniaturized particle detection device, e.g. comprising a microfluidic system.

Optionally, the one or more detectors comprise a plurality of sensors.

Optionally, the one or more detectors comprise a combination of a capacitive sensor and an optical sensor.

Optionally, the one or more detectors are non-intrusive and/or contactless detectors. Using a contactless detector, the risk of clogging in the channel at the location of the detector can be reduced. For example, a particle may pass a capacitive sensor and a pulse in the signal (capacitive change) may be detected, indicating the passing of the particle.

Optionally, a guiding element is employed at a detector location for guiding particles towards the detector.

Optionally, the guiding element is formed by means of a protuberance with a height of 0.1 to 0.7 times a flow channel height. The protuberance can be arranged at or near the location of a detector in a channel, for instance at an opposite side of the channel, such as to force the particles towards the detector. This can be used instead of using other means, such as for example an electrical element or a thermophoretic element. In this way, no additional electrical connections are required in the channels. This allows for a simpler design while increasing the robustness of the device.

The protuberance may for example form a ridge. Alternatively or additionally, a narrowed portion in the channel may be formed by the protuberance. This narrowed portion may act as a flow regulator. In an example, the choked flow restriction of the channel structure is formed by the one or more guiding elements. These guiding elements may ensure a substantially constant flow through the fluid flow passage of the channel structure.

Optionally, the inlet flow channel has a length of at least 10 times the hydraulic diameter of the inlet flow channel. In an example, the inlet flow channel has a length of at least 5 millimeter. The inlet flow channel may for example have a length of 5 to 20 millimeter. Typically, the hydraulic diameter of the inlet flow channel is around 0.1-5 millimeter. By means of such a minimum length, the influence of flow outside of the particle detection device can be reduced.

Advantageously, this can make the flow laminar and/or less turbulent. A minimum length may be required for obtaining a substantially laminar flow inside the channel. Other means may also be employed for obtaining a substantially laminar flow, the means being arranged for reducing the influence of the flow outside of the particle detection device. The length of the inlet flow channel can depend on the hydraulic diameter of the inlet flow channel and the flow rate through the particle detection device (cf. Reynolds number).

Optionally, the channel structure has channels with a height of 0.1-1 millimeter. In an example, channels inside the channel structure can have different heights.

Optionally, a ratio of a width of the main flow channel to a width of the side flow channel of the virtual impactor portion and/or further virtual impactor portion is between 0.1 and 1.

Optionally, the particle detection device is connected to a receiving device comprising a pump or fan for enabling a fluid stream through the fluid flow passage of the channel structure.

Optionally, the pump is a membrane or diaphragm pump. A membrane/diaphragm pump may have a low cost price. The fluid/gas flow through the particle detection device can be obtained by means of the membrane pump, wherein a proper accuracy is maintained since a constant flow is achieved through the design of the channel structure of the particle detection device. The channel structure comprises a choked flow restriction arranged for enabling a constant flow through the fluid passage of the channel structure of the particle detection device, independent of pressure conditions.

Optionally, the channel structure is removably connected to the receiving device. The receiving device may be arranged for being suitable to receive different (types of) particle detection devices. In an example, the receiving device is customizable to the size and/or shape of the particle detection device.

The receiving device may be a reading device comprising means for reading out data provided by the one or more detectors. Advantageously, the particle detection device is a miniature low-cost disposable/replaceable device, that can be used when inserted in the reading device of a particle detection system, such as an electronic reader, in which membrane pump and choked flow restriction are arranged. In this way, a modular design can be obtained, wherein the particle detection device forms a removable/disposable particle sensor cartridge. Alternatively, only the channel structure is removable and the detector is part of the reading device.

The reading device of the particle detection system may further comprise a control unit comprising electronics arranged for steering the pump and/or reading out and processing data from the one or more detectors of the particle detection device.

Optionally, at least a part of the channel structure is manufactured by means of additive manufacturing or 3D printing. A 3D printed channel structure or particle detection device allows for a relatively complex channel structures design.

Optionally, at least a portion of the detector is coated with a responsive coating arranged to react to the presence of gases so as to enabling the measurement of the concentration of gases. Additional information indicative of gas concentration can be obtained this way. Advantageously, the particle detection device may be arranged for both detecting the presence of particles and gas.

According to an aspect, the invention provides for a particle detection system comprising one or more particle detection devices and a reading device, wherein the one or more particle detection devices are removably connected to the reading device. The particle detection device may be suitable for use with any type of pump, providing improved design freedom. It may no longer be necessary to change a design of a channel structure based on the pump being used. Re-designing a channel structure may involve expensive computational fluid dynamics (CFD) simulations and fluid dynamics experimentation.

By changing the particle detection device of the particle detection system with a different particle detection device, other types of particles can be detected/measured with the same reading device of the particle detection system. One or more fluid connections can be arranged between the particle detection device and reading device. The fluid connection may be an air-tight connection. Furthermore, one or more electrical connections may be arranged for at least the one or more embedded or integrated detectors in the channel structure. Replaceable/disposable parts can enlarge service life and accuracy.

According to an aspect, the invention provides for a channel structure for use in a particle detection device. As a result of the choked flow restriction in the channel structure, the design of (micro-)channels of the channel structure of the particle detecting device can be made less dependent on the pump used by the device for enabling air to flow through the fluid flow passage. Hence, the influence of the pump on detecting particles by means of the particle detection device can be significantly reduced.

Optionally, the particles are fractioned into at least 2 different sizes, preferably at least 4, more preferably at least 6 sizes. Optionally the particles are fractioned into sizes ranging from 0.1 to 50 micrometer, more preferably 0.5 to 20 micrometer. Preferably, fractions of smaller than 1 micrometer, smaller than 2.5 micrometer, smaller than 4 micrometer, smaller than 5 micrometer, and smaller than 10 micrometer are relevant for human exposure studies.

The particles to be measured may consist of silica, carbon black, asbestos, particulate matter, fine dust, etc.

The air inlet may comprise a filter to remove the larger particles. Furthermore, the choked flow restriction may also additionally or alternatively be arranged in the inlet flow channel in order to regulate and maintain a substantially constant flow through the fluid flow passage.

According to an aspect, the invention provides for a cartridge comprising a particle detection device. The particle detection device may be in the form of a cartridge being removable, replaceable or disposable with respect to a reading/receiving device of the particle detection system. The particle detection system may comprise a reading/receiving device housing a pump or blower, and a particle detection device forming a disposable cartridge with channels. Suitable connection interfaces (e.g. fluid, electric, etc.) may be arranged between the particle detection device and the reading device of the particle detection system.

According to an aspect, the invention provides for a method for detecting airborne particles in a fluid stream by means of separation obtained by using a channel structure forming a fluid flow passage extending from an inlet to an outlet. The fluid flow passage comprises a plurality of flow channels arranged between an inlet flow channel connected to the inlet and the outlet flow channel connected to the outlet. The channel structure is connectable to a receiving device comprising a pump or fan for enabling a fluid stream through the fluid flow passage of the channel structure. The method comprises providing a first separation portion for branching off the inlet flow channel into at least one main flow channel and at least one side flow channel such as to separate the fluid stream into a minor flow in the at least one main flow channel and a major flow in the at least one side flow channel. The minor flow in the at least one main flow channel comprises a major portion of particles above a first predetermined size, and the major flow in the at least one side flow channel comprises a minor portion of particles above the first predetermined size. The method further comprises providing one or more detectors in at least one of the at least one main flow channel or at least one side flow channel for detecting particles. A choked flow restriction is arranged in the at least one of the plurality of flow channels for providing a choked flow, in use, such as to enable a constant flow independent of pressure conditions.

The channel structure can separate particles in different channels depending on the size, weight and/or shape of particles. The channel structure may also be arranged for enabling separation based on other features/properties of the particles. Advantageously, the channel structure may operate substantially independent of the pump or fan used for directing a fluid through the particle detection device. The choked flow restriction enables a substantially constant flow through the fluid passage of the channel structure of the particle detection device. Moreover, the influence of pressure fluctuations, for example due to the use of a diaphragm pump, in the fluid flow in the fluid flow passage of the channel structure can be significantly reduced.

A virtual impactor may comprise one or more virtual impactor portions branching off a channel into at least one major flow channel and at least one minor flow channel. In an example, the channel structure of the particle detection device is virtual impactor.

Advantageously, a diaphragm pump or other cheaper and/or less accurate pumps (or fans) can be used in conjunction with the particle detection device.

The choked flow restriction is dimensioned to keep the flow in the channel structure substantially constant. Hence, it can act as a flow regulator.

Typically, a fan creates a not well-defined air flow from which the amount of particles can be difficult to calculate. Advantageously, by means of the choked flow restriction also a fan can be used since a substantially constant flow is obtained independent of pressure conditions. A membrane pump can also be used, facilitating the miniaturization of the particle detection device.

A channel of the channel structure, such as the inlet flow channel, may be branched off at a separation portion into one or more branches (i.e. further channels). These branches can then in turn again be branched off into one or more further branches at a further separation portion. In an example, a channel is branched off in a plurality of branches/channels at a separation portion. In this way, multiple branches/channels can be separated from a fluid stream, such as to obtain a plurality of different fractions. In an example, two to ten different fractions are obtained. A larger number may also be possible. In an example, each branched off channel has a detector arranged for detecting particles inside said channel. The particles may stick on the detector and an accumulation can be measured. Alternatively or additionally, for instance using an additional detector, the particles can be measured as they pass.

In an example, particles are detected at different locations in the channels with different detectors.

Optionally, the choked flow restriction is provided in the outlet flow channel.

Optionally, a critical orifice is used as the choked flow restriction.

Optionally, a channel constriction is used as choked flow restriction, the constriction having a hydraulic diameter of 50 to 300 micrometer.

Optionally, the hydraulic diameter of the choked flow restriction is adjustable.

Optionally, the hydraulic diameter of the choked flow restriction is selected on the basis of to be detected particles.

Optionally, at least a part of the channel structure is manufactured by means of additive manufacturing or 3D printing.

Certain members of most embodiments of the present invention can be made in multiple parts designed for modular assembly of different sizes and shapes and for easy removal and, if necessary replacement of some members or parts of members without disassembly of the entire assembly. Next to the particle detection device, the removable parts may include for example the pump, parts of the channel structure, the channel structure, one or more channels, one or more detectors and the choked flow restriction. Other parts can also be removable.

The particle detection device may provide detection and/or measurement data in real-time. Advantageously, filtering and long detection/measurement times are not required.

The particle detection device can be utilized in may fields, such as construction industry, mining industry, health industry, high-tech industry (e.g. clean room), machine construction industry, building industry, forestry, personal use (e.g. personal monitoring), etc. For example, the particle detection device may be used as a dust sensor. It can be used in all kinds of occupations in which persons come in contact with airborne particles, dust and/or contaminants. The particle detection device may also be used as a personal sensor for measuring exposure to certain particles, for example in cities, vehicles, trains, buses, etc.

The particle detection device can be suitable for being carried by a user, for instance reducing risk of certain exposure when operating in potentially dangerous or hazardous environments.

The miniaturization of the particle detection device can be facilitated so that the device can also be used in other portable devices, such as for example smartphones or tablets. Alternatively or additionally, the particle detection device may form, or be part of, a lab-on-a-chip (LOC).

In this description wording like about and substantially should be understood as meaning that variations of a given value it refers to are allowable within the given definition, which variations can at least be 5%, preferably at least 10% and more preferably at least 15% of the given value.

It is appreciated that a choked flow can be seen as a compressible flow effect, wherein the fluid velocity or flow becomes limited or choked. When a flowing fluid at a given pressure and temperature passes through the choked flow restriction into a lower pressure environment the fluid velocity increases. As a result of the Venturi effect the static pressure, and hence the density, is decreased downstream beyond the choked flow restriction. A choked flow can be seen as a limiting condition where the mass flow will not increase with a further decrease in the downstream pressure environment while upstream pressure is fixed. At choked flow, the mass flow rate may be increased only by increasing density upstream and at the choke point. Please note that although the gas velocity reaches a maximum and becomes choked, the mass flow rate is not choked. The mass flow rate can still be increased if the upstream pressure is increased as this increases the density of the gas entering the orifice.

The invention thus conceived is susceptible of numerous modifications and variations, all of which are within the scope of the inventive concept.

It will be appreciated that any of the aspects, features and options described in view of the device apply equally to the method and the described channel structure and system. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
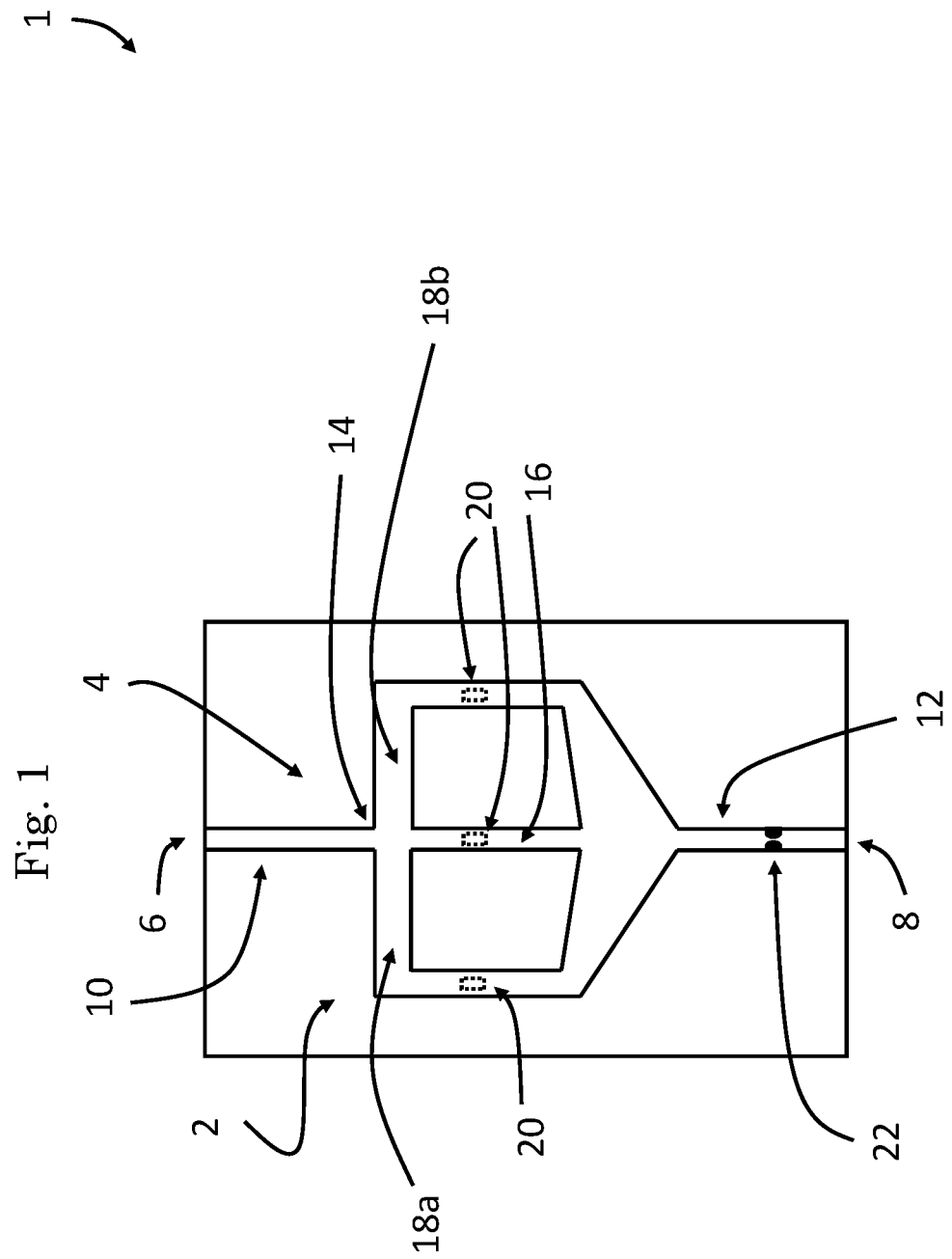
FIG. 1 shows a schematic diagram of an embodiment of a particle detection device.

FIG. 1 shows a schematic diagram of an embodiment of a particle detection device 1. The particle detection device 1, includes a channel structure 2 arranged for detecting particles in a fluid stream by means of separation. The channel structure 2 forms a fluid flow passage 4 extending from an inlet 6 to an outlet 8. The fluid flow passage 4 comprises a plurality of flow channels arranged between an inlet flow channel 10 connected to the inlet 6 and an outlet flow channel 12 connected to the outlet 8. The inlet flow channel 10 extends from the inlet 6 to a first separation portion 14 arranged for branching off the inlet flow channel 10 into at least one main flow channel 16 and two side flow channels 18a, 18b. The first separation portion 14 is arranged to separate the fluid stream into a minor flow in the at least one main flow channel 16 and a major flow in the two side flow channels 18a, 18b. The minor flow in the at least one main flow channel 16 comprises a major portion of particles above a first predetermined size, and the major flow in the two side flow channels 18a, 18b comprise a minor portion of particles above the first predetermined size. The main flow channel 16 and the side flow channels 18a, 18b comprise a detector 20 arranged for detecting particles. Furthermore, the channel structure 2 comprises a choked flow restriction 22 arranged for enabling a constant flow independent of pressure conditions.

The first separation portion 14 is arranged such that in a constant flow, particles above a predetermined size go straight through the main flow channel 16 and particles under the predetermined size are deflected in the side flow channels 18a, 18b.

The gas flow in the channel structure 2 of the particle detection device 1 can be regulated by means of arranging a critical orifice or a channel constriction. This ensures constant flow through the fluid flow passage of the channel structure (depending i.a. on the diameter of the channel(s) of the channel structure 2). In this example, the choked flow restriction 22 is arranged at the exit of the channel structure 2, namely in the outlet flow channel 12 of the channel structure 2. However, the choked flow restriction 22 may also be arranged at other locations in the channel structure 2.

A pump, blower or fan can be provided for inducing a flow in the channel structure 2. The channel structure 2 is arranged for separation of particles according to size and/or shape. The choked flow restriction 22 can effectively prevent large pressure fluctuations or fluid/gas velocity changes when employing a low-cost diaphragm pump. Such fluctuations in the channel structure 2 can be detrimental for detecting particles by means of the detectors 20 of the particle detection device 1. Advantageously, the flow rate can be kept substantially constant by means of the choked flow restriction 22 arranged in the fluid passage 4 of the channel structure 2. Advantageously, the choked flow restriction 22 can be manufactured directly during the production of the channel structure 2. Hence, the manufacturing complexity and the costs involved can be effectively reduced. Moreover, a robust design can be obtained which is less sensitive to wear.

The operation of the particle detection device 1 can become substantially independent of the operation of the pump, as long as it can achieve a pressure difference between the inlet 6 and the outlet 8 of the particle detection device 1. Optionally, a substantially constant flow is obtained if a negative pressure of more than 0.5 bar is achieved between the inlet 6 and the outlet 8, for example by means of a pump or blower.

The particle detection device 1 may be used for monitoring air pollution or air quality (cf. particulate matter, fine particles, nitrogen dioxide, ozone, etc.). The particle detection device 1 can also be used for detecting other particle shapes (e.g. asbestos). Real-time detection of airborne particles allows diagnosing the causes of air pollution or air quality.

The detectors 20 may be arranged to count particles passing through a channel. Alternatively or additionally, the detectors 20 are arranged to provide information about a size of the particles. Other properties/features may also be derived, such as the shape, chemical properties, etc.

The detector 20 can be integrated into the channels 16, 18a, 18b in different ways. In an example, a silicon wafer with required electronics is attached to the channels 16, 18a, 18b, making it an integral part of the channel structure 2. This makes it possible to integrate a plurality of detectors 20 at a time in different channels 16, 18a, 18b of the channel structure 2. In addition, silicon technology makes it possible to use low-cost detectors 20 for example based on interdigitated electrodes, surface acoustic wave, thin-film bulk acoustic resonator, etc. Also, integrated optical waveguides on silicon can be used to measure chemical composition via for example infrared signals.

The particles guided through the different channels may be detected using a detector 20 which may have multiple sensors detected at different locations within one channel, for example downstream or upstream with respect to each other or arranged on the opposite side of said channel.

Preferably the substantially constant flow rate is in the range 5 to 500 ml/min. In this example, a substantially constant flow rate of 50 ml/min is obtained for the particle detection device.

Figure 2:
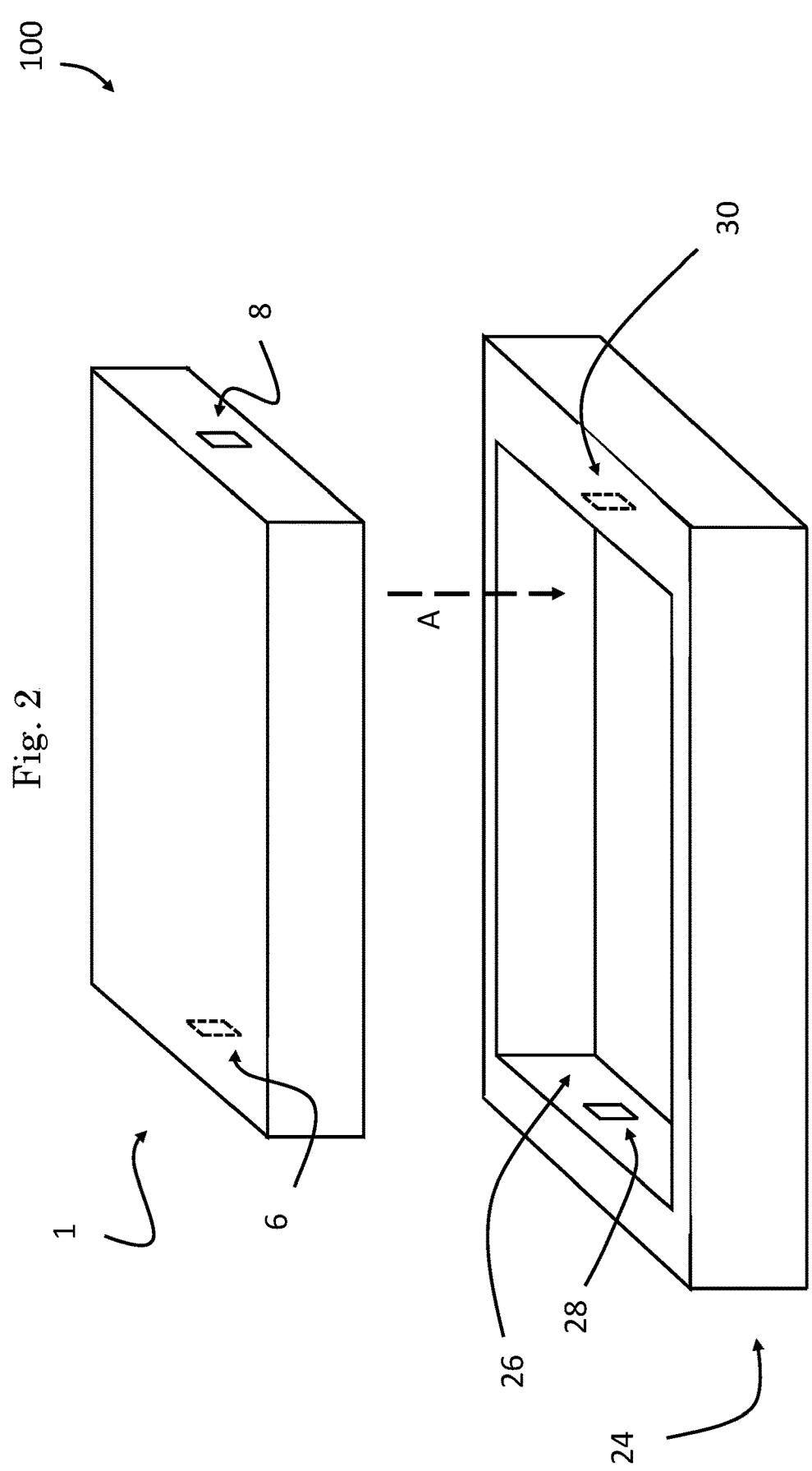
FIG. 2 shows a schematic diagram of an embodiment of a particle detection system.

FIG. 2 shows a schematic diagram of an embodiment of a particle detection system 100. The particle detection system 100 comprises a particle detection device 1 and a reading/receiving device 24. The particle detection device 1 is removably connected to the reading device 24. The channel structure 2 of the particle detection device 1 is not shown in this figure.

Also in this example, the particle detection device 1 is arranged for separation and detection of separated particles in different channels in the channel structure 2. The channel structure 2 comprises one or more separation portions and/or virtual impactors by which a major and minor flow channel is provided for separating particles depending on their specific properties (e.g. size, shape). The channel structure comprises a first flow regulator 22 formed by a choked flow restriction for controlling the volumetric flow rate through the fluid flow passage 4 of the channel structure 2. Preferably, the first flow regulator 22 is arranged at the outlet flow channel 12 and/or the inlet flow channel 10. However, the first flow regulator 22 may also be arranged at other, possible multiple, locations of the channel structure 2. The one or more particle detectors can be arranged to measure the presence, accumulation and/or passing of particles in a fluid stream in a channel in which they are arranged. Preferably, the detectors are embedded or integrated in the channels. Optionally, the channel structure 2 further comprises at least one second flow regulator formed by a narrowed portion in the channel at or near at least one detector location, wherein the narrowed portion is provided for guiding particles towards the detector 20. In this way, a better flow control can be obtained in the channel structure 2, while additionally improving the detection accuracy of the at least one detector 20 arranged in the channel structure 2.

In this example, the particle detection system 1 is detachable, replaceable, disposable and/or removable. The particle detection device 1 is inserted in a slot 26 arranged in the reading device 24 (arrow A). The slot 26 may be arranged for receiving and holding the particle detection device 1. For example, the particle detection device may be removed from the particle detection system 100 and/or replaced by another particle detection system 100. A replacement may for example be needed in case of contaminated channels inside of the channel structure 5, clogged channels inside the channel structure 2, damaged or malfunctioning detectors 20 or particle detection device 1, etc. In an alternative example, only a portion of the particle detection device 1 is insertable in the reading device 24.

The particle detection device 1 may form a separate component of the particle detection system 100. The slot 26 of the reading device 24 may be shaped such as to snugly fit around a portion of the particle detection device 1, such as to exert a substantially uniformly distributed pressure on said portion of the particle detection device 1.

The reading device 24 may comprise an inlet port 28 and an outlet port 30 arranged to connect to the inlet 6 and the outlet 8 of the particle detection device 1, respectively, when the particle detection device 1 is inserted in the reading device 24. Optionally, the inlet and outlet ports 28, 30 are sealed ports, for instance comprising a sealing grommet.

Figure 3:
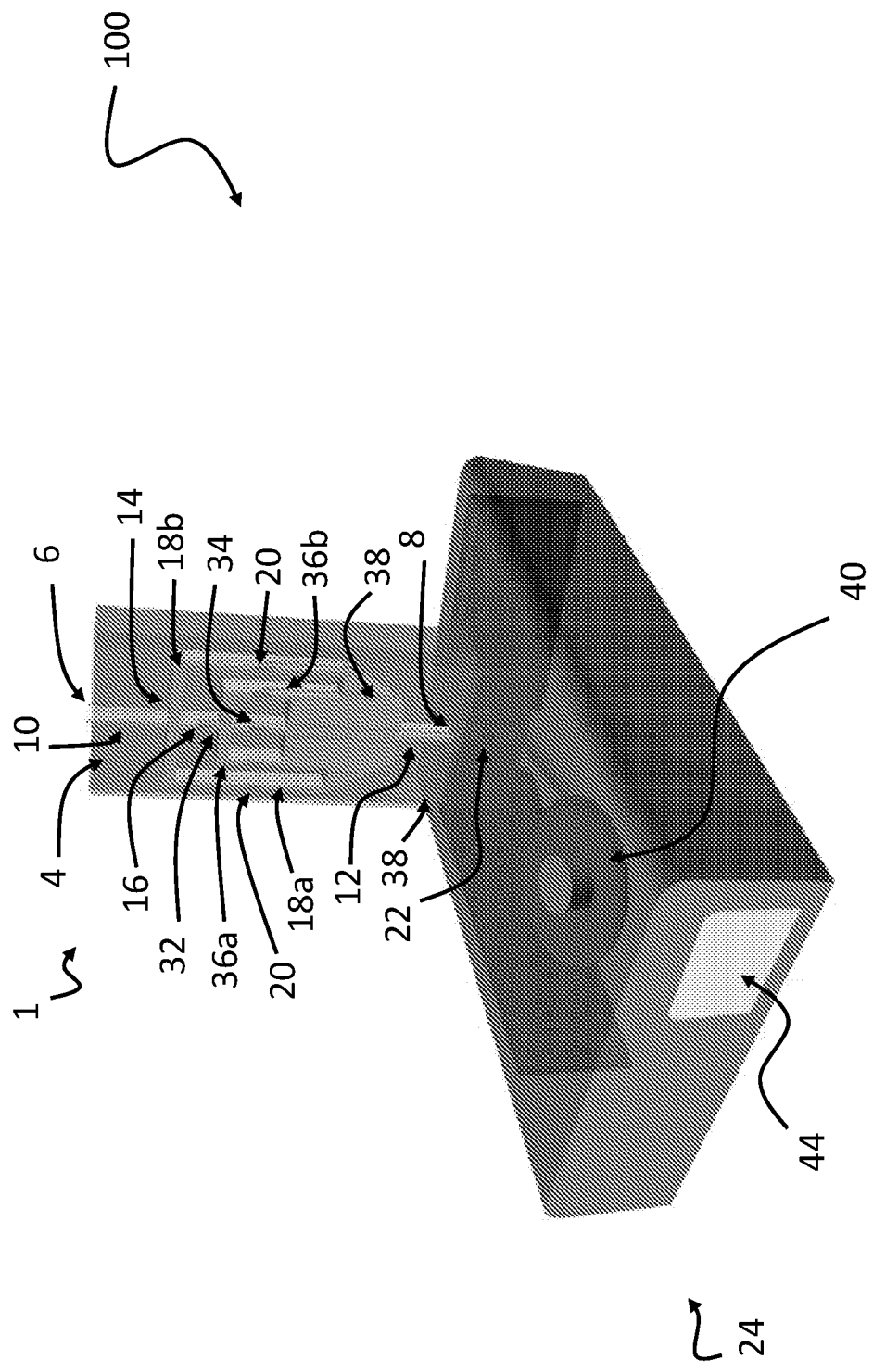
FIG. 3 shows a schematic diagram of an embodiment of a particle detection system.

FIG. 3 shows a schematic diagram of an embodiment of a particle detection system 1. The particle detection device 1 includes a channel structure 2 which is configured for detecting airborne particles in a fluid stream by means of separation. The channel structure comprises two separation portions arranged for separating particles inside a flow stream according to their size and/or weight. Separation may also be based on other particle characteristics, features or properties. For this purpose, the design of the channel structure 2 can be adapted for that purpose. The channel structure 2 or virtual imp actor(s) of the particle detection device 1 can for instance be designed using computational models. Experimental verification or design is also possible. By means of computational models (e.g. computational fluid dynamics models or analytical models) the shape, orientation and dimensions of the channels of the channel structure can be designed. The design can be facilitated since the choked flow restriction 22 enables a substantially constant flow through the channel structure 2. Advantageously, the channel structure 2 can be 3D printed or injection molded.

A fluid flow passage 4 is formed by the channel structure 2, extending from the inlet 6 to the outlet 8. The fluid flow passage 4 comprises a plurality of flow channels arranged between an inlet flow channel 10 connected to the inlet 6 and an outlet flow channel 12 connected to the outlet 8. The inlet flow channel 10 extends from the inlet 6 to a first separation portion 14 arranged for branching off the inlet flow channel 10 into at least one main flow channel 16 and two side flow channels 18a, 18b. The channel structure 2 comprises a plurality of separation portions 14, 32. In this example, the channel structure 2 comprises a further separation portion 32 downstream of the first separation portion 14. The further separation portion 32 is arranged for branching off the at least one main flow channel 16 of the first separation portion 14 into a further main flow channel 34 and two further side flow channels 36a, 36b. Similar to the first separation portion 14, the further separation portion 32 is arranged to separate the fluid stream into a minor flow in the further main flow channel 34 and a major flow in the two further side flow channels 36a, 36b. The minor flow in the further main flow channel 34 comprises a major portion of particles above a second predetermined size, and the major flow in the two further side flow channel comprises a minor portion of particles above the second predetermined size.

The main flow channel 16, further main flow channel 34, the side flow channels 18a, 18b, the further side flow channels 36a, 36b each comprise a detector 20 arranged for detecting particles. It is appreciated that a larger number of detectors 20, for instance at other locations in the channel structure 2 can be arranged. Clogging can be substantially prevented using contactless detectors 20 which are arranged to measure particles flowing in air instead of contacting the particles (e.g. sticking particles on a surface). Preferably the detector 20 comprises capacitive electrodes. The detector 20 may be integrated in a channel. Advantageously, the design of the particle detection device can be made smaller. Other embodiments are also envisaged, wherein the detectors comprise at least one of a thin-film bulk acoustic resonator sensor, a surface wave acoustic wave sensor, an optical waveguide sensor, etc. Other microelectromechanical system detectors or wafer detectors may also be employed. In this way, the detectors can be made small and inexpensive, facilitating miniaturization of the design of the particle detection device 1.

The detector 20 may be coated with a responsive coating, which reacts to the presence of gases, enabling the measurement of the concentration of gases by said detector 20. In this way, not only information about, for example, air pollution by particles or particulate matter can be obtained, but also information indicative of gas concentration such as NON, 03, etc., in the air.

The detector 20 may comprise interdigitated capacitance sensors for the detection of particles. Separation of particles can take place in the channel structure on the basis of size, shape and/or mass. It is possible to separate elongate particles from round particles, which can make the distinction between for example dust and asbestos. The channel structure may also be configured to provide separation based on other shapes of the particles. The detection of particles in the flow stream behaving differently as a result of a difference in shape can be improved by changing the distance between and/or orientation of the electrodes in the capacitive sensor (cf. interdigitated capacitive sensor). Particles having diameters smaller than the distance between the interdigitated electrodes will give a higher signal than particles having diameters larger than the distance between the interdigitated electrodes and which cannot penetrated between the electrodes. Furthermore, an elongated particle that is aligned with the interdigitated electrodes can give a higher signal than elongated particles that are positioned perpendicular. Therefore, the orientation of the interdigitated electrodes in the flow channels (e.g. parallel or perpendicular or angled) can also result in additional information about the shape and orientation of the particles.

The channel structure 2 comprises a choked flow restriction 22 arranged for enabling a constant flow independent of pressure conditions. In this example, the constant flow in the channel structure 2 is provided by means of a critical orifice providing a choked flow restriction 22. The critical orifice may form a channel constriction having a reduced hydraulic diameter compared to the rest of the channel.

A pump 40 is arranged in the reading device 24 for sucking air through the channels of the channel structure 2. The flow rate in the channel structure 2 of the particle detection device 1 may be kept substantially the same, regardless of which pump 40 (or fan) is utilized. In this way, the particle detection device 1 may be compatible with various reading devices 24 comprising pumps 40 with different characteristics.

The particle detection system 100 includes the particle detection device 1 and the reading device 24, the particle detection devices 1 being removably connected to the reading device 1. The particle detection device 1 may be suitable for use with any type of pump, providing improved design freedom. It may no longer be necessary to change a design of a channel structure 2 of the particle detection device 1 based on the pump 40 being used for guiding air through the fluid flow passage of the channel structure 2 of the particle detection device 1. For instance, by replacing the particle detection device 1 with another particle detection device, other types of particles can be detected/measured with the same reading device 24 of the particle detection system 100.

In this example, next to the slots arranged for providing a fluid communication between the particle detection device 1 and the reading device 24, an electrical connection 38 is provided for enabling an electrical connection between the particle detection device 1 and the reading device 24. The electrical connection 38 is arranged in such a way that it can be uncoupled when the particle detection device 1 is removed from the reading device 24. By means of the electrical connection 38 signals obtained from the integrated detectors in the channel structure can be transferred to the reading device 24. In an alternative example, the signals are transferred wirelessly. A combination is also possible.

Advantageously, the channel structure is a microfluidic channel structure. A microfluidic approach is suitable for miniaturized detection mechanisms (e.g. interdigitated capacitance sensor, film bulk acoustic resonator/surface acoustic wave sensor, integrated optics infrared absorption sensor, etc.). Furthermore, a microfluidic approach is suitable for particle shape assessment (e.g. asbestos) and enables separation into various particles sizes (cf. fractions). A microfluidic approach allows obtaining a miniaturized particle detection device which can be integrated in small (portable) devices, such as other sensors, mobile phones, vehicles, clothes, tablets, etc. Additionally, a replaceable microfluidic approach enables the use of different particle detection devices, in the form of cartridges, in a same reading device 24 of particle detection system 100.

In an example, the choked flow restriction is arranged to cause a substantially constant flow rate of approximately 50 ml/min through the fluid flow passage of the channel structure.

The reading device 24 may comprise an optional display 44 arranged for displaying information based on data provided by the detectors 20.

This hydraulic diameter can be adjusted by means of an actuator. In an example, the hydraulic diameter is adjusted electrically by means of a piezo element, electroactive polymer, microelectromechanical system (MEMS) switch or thermal actuator.

Figure 4:
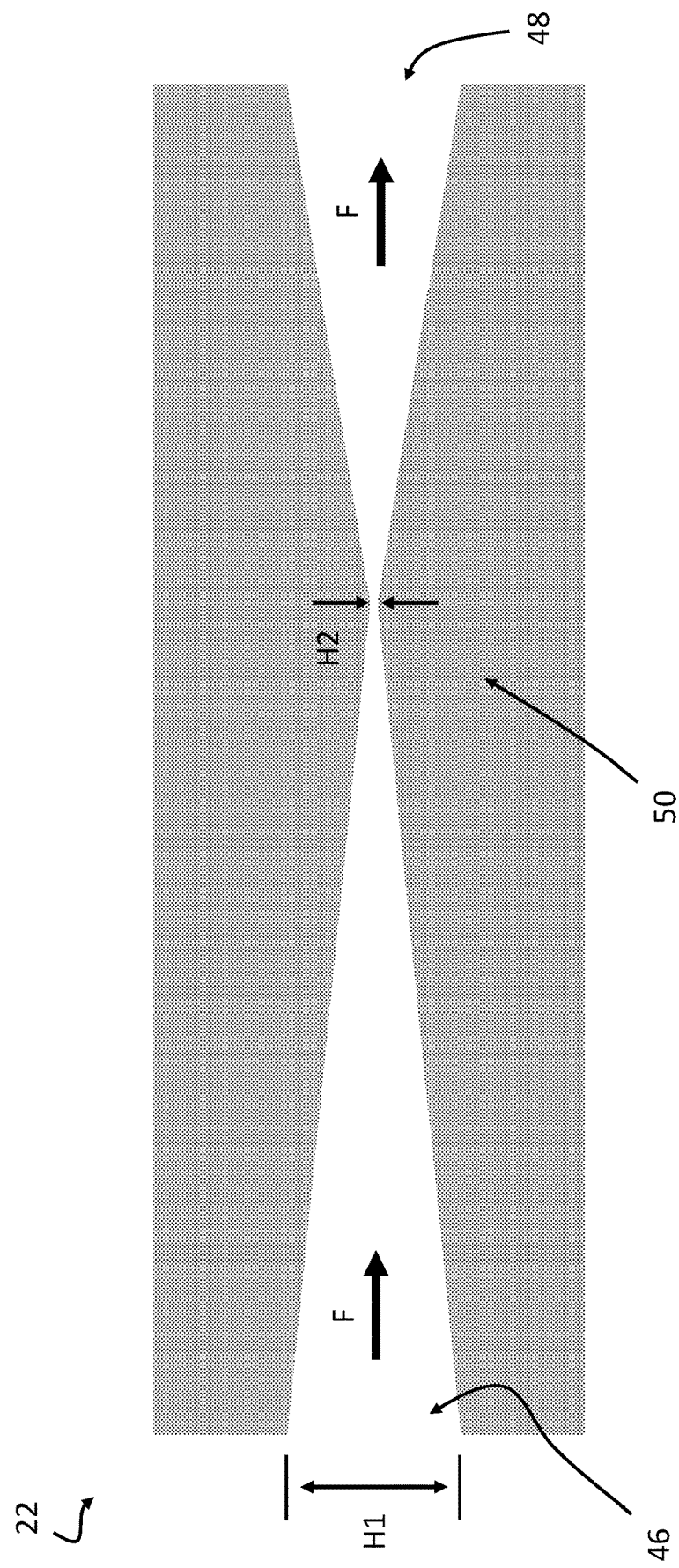
FIG. 4 shows a schematic diagram of a choked flow restriction.

FIG. 4 shows a schematic diagram of a choked flow restriction 22 (sectional view). The choked flow restriction 22 in the channel structure 2 of the particle detection device 1 can be configured to induce a choked flow in the channel structure 2 or fluid flow passage 4. The choked flow restriction 22 effectively enables a substantially constant flow through the fluid passage 4 of the channel structure 2 of the particle detection device 1. The choked flow restriction 22 comprises an inlet portion 46 and an outlet portion 48, wherein fluid or gas can enter the choked flow restriction 22 through the inlet portion 46 and exit the choked flow restriction 22 through the outlet portion 48. A narrowed portion 50 is arranged between the inlet portion 46 and the outlet portion 48 of the choked flow restriction 22. The direction of the flow stream is indicated with arrow F. The inlet portion 46 of the choked flow restriction 22 has an inlet (hydraulic) diameter H1. The (hydraulic) diameter in the choked flow restriction 22 is reduced to a restriction (hydraulic) diameter H2 at the narrowed portion 50. Then, the (hydraulic) diameter is again increased in the direction of the outlet portion 48. The (hydraulic) diameter at the outlet portion 48 may substantially correspond to the (hydraulic) diameter of the inlet portion 46. However, these diameters may also be different. The narrowed portion 50 may be arranged to provide the Venturi effect.

It is appreciated that the choked flow restriction 22 may be arranged as an intermediate piece providing a fluid connection between two portions of a channel of the channel structure 2.

As a result of the choked flow (of gases), the mass flow rate can become substantially independent over a pressure working range (which may be typically between 0-0.5 bar, when the upstream pressure is for example atmospheric) of the downstream pressure. A pump or fan may be arranged for example downstream (i.e. connected to the outlet 8). That way, the choked flow may depend only weakly on the temperature and pressure and hence the density of the gas on the upstream side of the choked flow restriction. With other words, the mass flow rate may be primarily dependent on the cross-sectional area or hydraulic diameter H2 of the choked flow restriction 22 and the pressure upstream of the choked flow restriction 22. The mass flow rate may be substantially independent on the downstream pressure in the pressure working range obtained by the choked flow restriction 22. In an example, the restriction (hydraulic) diameter H2 at the narrowed portion 50 is in the range of 50 to 300 micrometer. Additionally or alternatively, the inlet (hydraulic) diameter of the inlet portion 46 of the choked flow restriction 22 has a diameter in the range of 0.1-5 millimeter.

Figure 5:
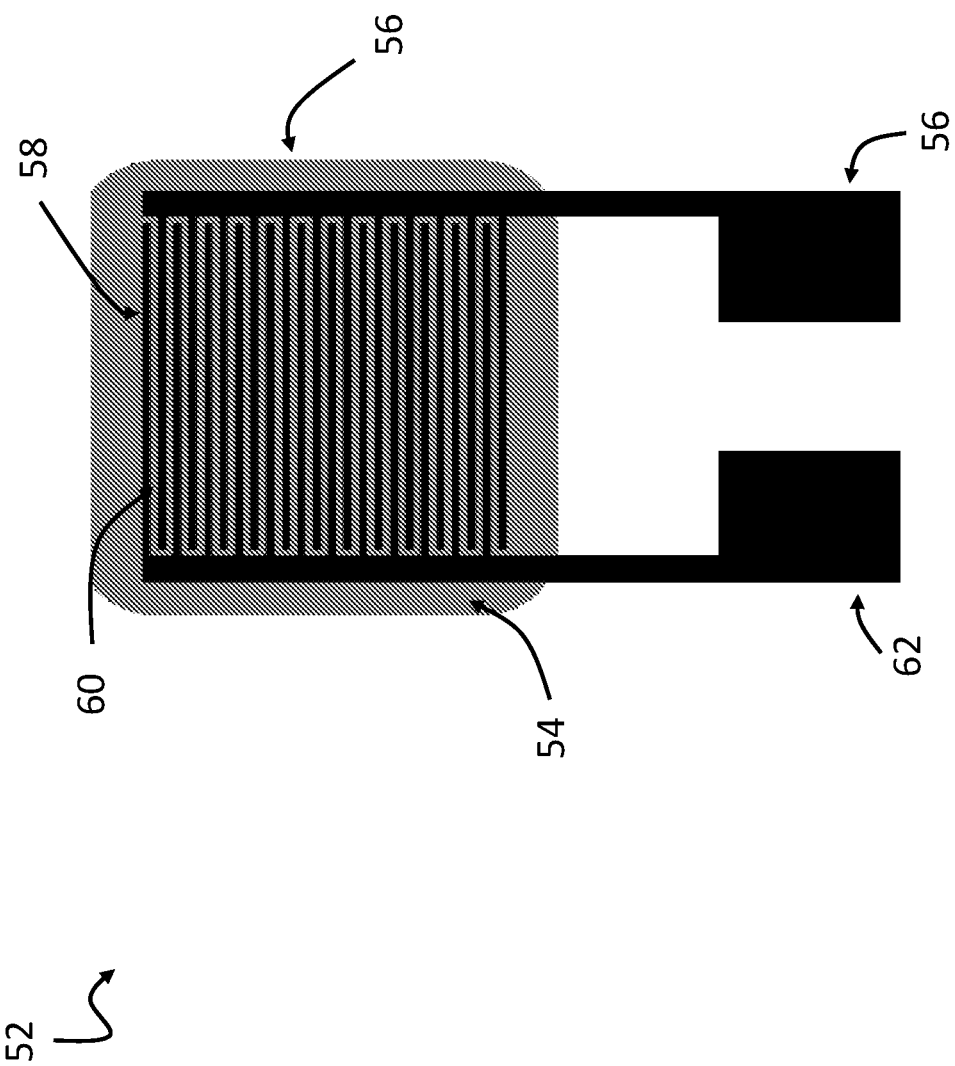
FIG. 5 shows a schematic diagram of an interdigitated capacitance sensor.

FIG. 5 shows a schematic diagram of an interdigitated capacitance sensor 52 comprising interdigitated electrodes 56. The interdigitated electrodes 56 provide a pattern formed by a plurality of conductive lines or strips 58. A gap or spacing 60 is arranged between the conductive lines 58. In an example, the gap 60 (i.e. distance) between the conductive lines is in the range of 0.5-20 micrometer. This way, a measurable capacitance between two conductive lines 58 can be measured. Additionally or alternatively, a width of the conductive lines 58 is in the range of 0.5-20 micrometer. The interdigitated electrodes 56 are connected to bond gaps 62 of the interdigitated capacitance sensor 52. Optionally, the sensor 52 comprises a film 54 covering at least a part of the conductive lines 58. It is appreciated that the interdigitated capacitance sensors 52 may be arranged in a different way. Other interdigitated electrode configurations are possible and may be employed.

The bond gaps 62 can be electrically connected to a measuring unit. In an example, a voltage is supplied at a frequency to the interdigitated electrodes 52 via the bond gaps 62. At least a capacitive term can then be measured from a sensed capacitive signal of the capacitance sensor 52. The obtained capacitive term can be used for measuring an indication of a particle in proximity of and/or in between the conductive lines 58a, 58b. The measuring unit may comprise means for detecting/measuring the capacitive term.

Figure 6:
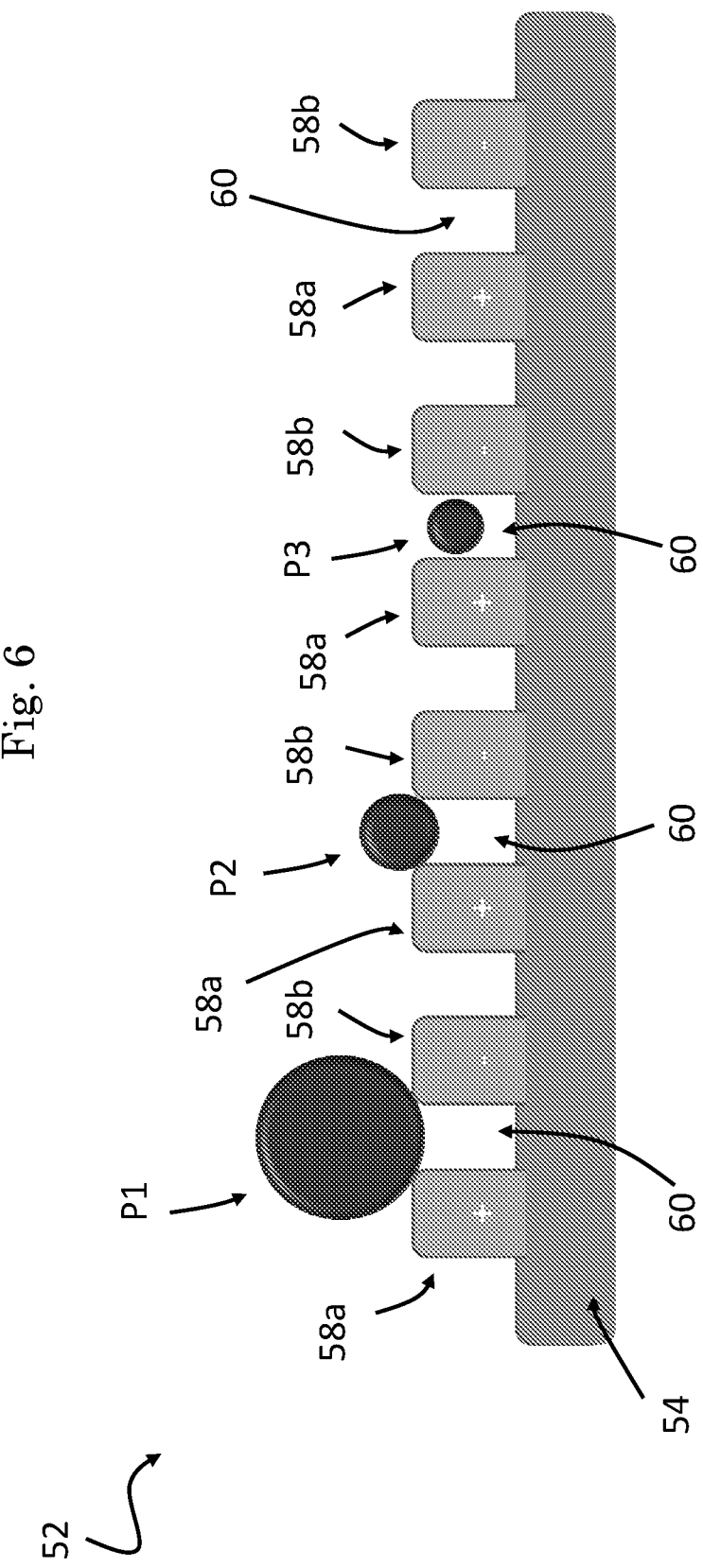
FIG. 6 shows a cross sectional view of an interdigitated capacitance sensor.

FIG. 6 shows a cross sectional view of an interdigitated capacitance sensor 52. A series of interdigitated positive electrodes 58a and negative electrodes 58b are formed by the conductive lines 58 of the interdigitated electrodes 56. Detection of particles P1, P2, P3 having different diameters is shown. Particle P1 has the largest diameter and particle P3 has the smallest diameter. Particle P1 is larger than the gap 60, particle P2 has a diameter corresponding to the gap 60, and particle P3 is smaller than the gap 60. When a particle P1, P2, P3 moves between the two adjacent conductive lines 58, or is immobilized on the surface of the conductive lines 58, a change in capacitance is measured. This can be converted to a signal indicative of the presence of a particle P1, P2, P3. By changing the distance between the conductive lines, or the position of the interdigitated capacitance sensor 52 in a channel of the channel structure 2, particle size, shape and orientation can be derived from the resulting capacitance signal.

It is appreciated that the detection of particles in the flow stream in a channel of the channel structure 2 behaving differently as a result of a difference in shape can be improved by changing the distance between and/or orientation of the interdigitated electrodes 56 in the interdigitated capacitance sensor 52.

In the shown example, particle P3 will result in a higher measured signal than particle P1. Particle P1 is not able to penetrated between the electrodes 58a, 58b. Furthermore, an elongated particle that is aligned with the interdigitated electrodes 56 can give a higher signal than elongated particles that are positioned perpendicular. Therefore, the orientation (e.g. parallel or perpendicular) of the interdigitated electrodes 56 in a channel of the channel structure 2 may also result in additional information about the shape and orientation of the detected particles.

In the shown example the particles P1, P2, and P3 have a round shape, however, the particles P1, P2, and P3 may also have other shapes (e.g. elongated).

Detection or measurement by means of the capacitive proximity sensor 52 is based on a change in capacity between conductive lines 58*a*, 58*b*. Such a change in capacity may depend on the distance between the electrodes, electrode surface area, and/or permittivity of the medium in between the conductive lines 58*a*, 58*b*. The capacitance sensor may induce field lines which can be influenced by an particle in vicinity of the sensor conductive lines 58*a*, 58*b* of the capacitance sensor 52. A capacitance (or impedance) sensor may provide high robustness for measuring particles in a gas, while being able to perform a contactless detection.

The capacitance sensor 52 may be arranged to detect particles by taking into account typical properties of the particles. In this way, the capacitance sensor 52 may be tuned for detecting or measuring certain particles.

It is appreciated that other impedance sensors may also by used instead of a capacitance sensor.

Figure 7:
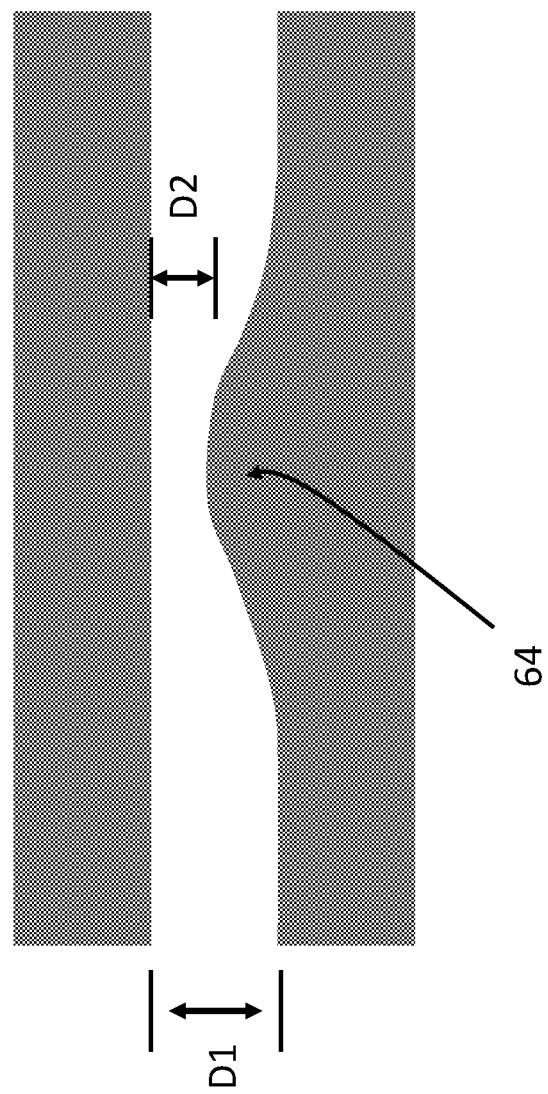
FIG. 7 shows a schematic diagram of a channel of a channel structure with a guiding element.

FIG. 7 shows a schematic diagram of a channel of the channel structure 2 comprising a guiding element 64 (sectional view). In an advantageous way, the guiding element 64 can be employed at a detector location for guiding particles in the fluid stream towards the detector, such as to improve particle detection by that particle detection device 1. The guiding element 64 forms a protuberance 64. The channel of the channel structure 2 has a height D1. In an example, the protuberance 64 has a height D2 in the range of 0.1-0.7 the channel diameter D1. In this way, by means of the protuberance a portion with a narrowed diameter D2 can be obtained in the channel of the channel structure 2. The protuberance 64 can be arranged at or near the location of a detector 20 in the channel, for instance at an opposite side of the channel, such as to force the particles towards the detector 20.

Figure 8:
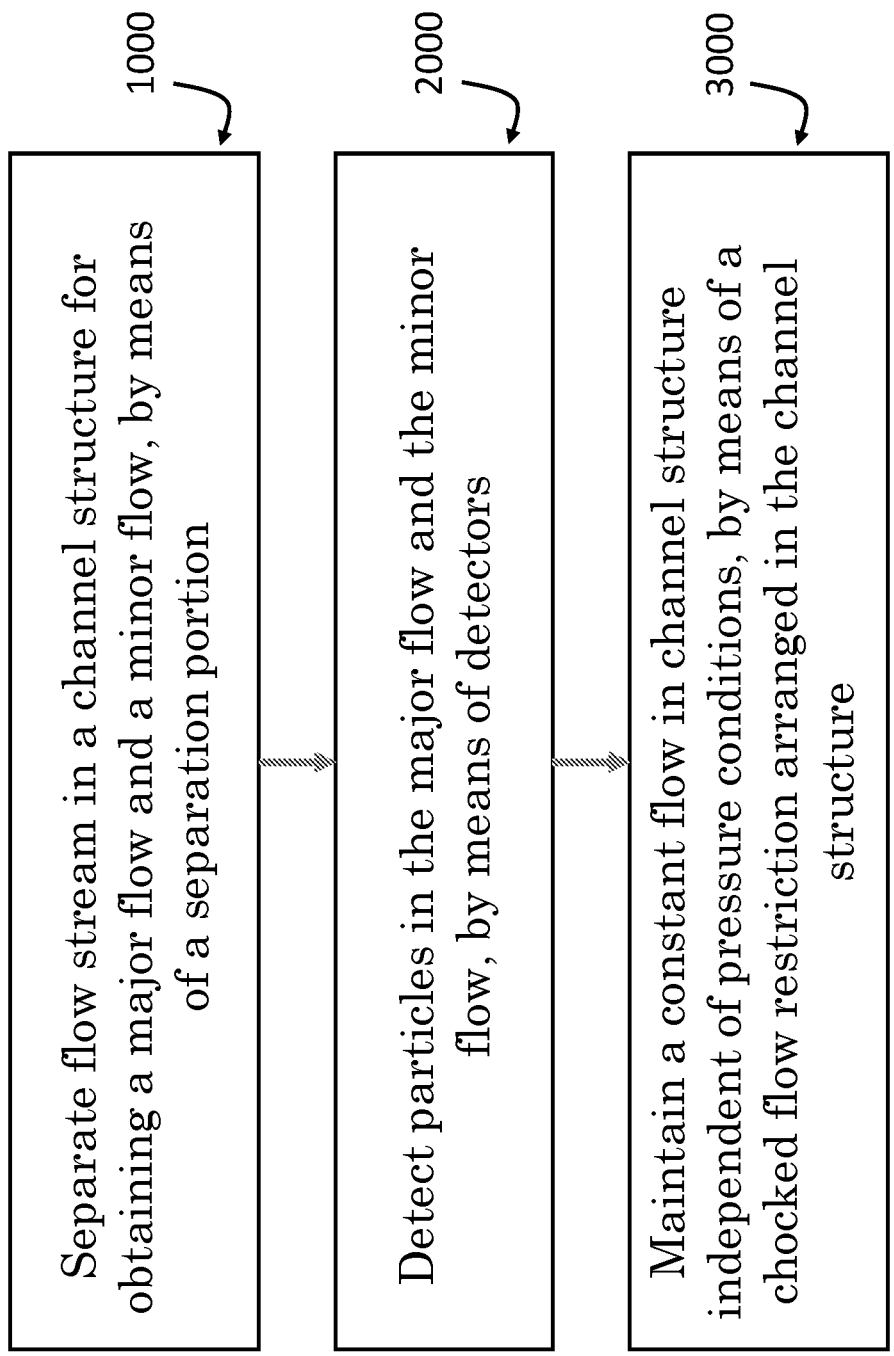
FIG. 8 shows a schematic diagram of a method for detecting airborne particles in a fluid stream.

FIG. 8 shows a schematic diagram of a method for detecting airborne particles in a fluid stream by using a particle detection device 1. Separation of particles is obtained by using a channel structure 2 forming a fluid flow passage 4 extending from an inlet 6 to an outlet 8. The fluid flow passage 4 comprises a plurality of flow channels arranged between an inlet flow channel 10 connected to the inlet 6 and the outlet flow channel 12 connected to the outlet 8. In the first step 1000, the flow stream is separated in the channel structure 2 for obtaining a major flow and a minor flow by means of a separation portion 14. In the second step 2000, the particles in the major flow and the minor flow are detected by means of detectors. In the third step 3000, a substantially constant flow is maintained in the channel structure 2 independent of pressure conditions by means of a choked flow restriction.

The method may include providing a first separation portion 14 for branching off the inlet flow channel into at least one main flow channel and at least one side flow channel such as to separate the fluid stream into a minor flow in the at least one main flow channel and a major flow in the at least one side flow channel. The minor flow in the at least one main flow channel comprises a major portion of particles above a first predetermined size, and the major flow in the at least one side flow channel comprises a minor portion of particles above the first predetermined size. The method may include providing one or more detectors in at least one of the at least one main flow channel or at least one side flow channel for detecting particles. A choked flow restriction is arranged in the channel structure for enabling a constant flow independent of pressure conditions.

The method enables separating particles in a gas using a channel structure manufactured in a slab of material, wherein the gas is sucked or guided through the channels by means of a pump housed outside the slab. The gas flow can be regulated by means of a choked flow restriction forming a critical orifice manufactured in the channel structure. The choked flow restriction can be arranged in the inlet flow channel and/or the outlet flow channel. The particles are detected by detectors embedded in the channels, and the processing is done by electronics outside the slab.

The channel structure can be manufactured in plastic or glass by means of 3D printing, etching or injection molding. Other suitable materials and manufacturing techniques may also be used.

The particle detection device may be part of a lab-on-a-chip (LOC) or micro-total-analysis-system device integrating one or more laboratory functions on a single integrated circuit, chip or system. The lab-on-chip device may have compact dimensions enabling further miniaturization.

Microfluidics with integrated electronics are advantageously employed for detecting airborne particles. The particle detection device may provide for an inexpensive, small portable device allowing measuring personal exposure of persons to particulate matter and/or air pollution, and preferably also having the ability to provide some information about the composition, properties, features and/or other characteristics of detected particles in the air.

It should be noticed that the particle detection device may be relatively easy to produce (e.g. employing 3D printing or injection molding) and that even the cost linked to implementing the invention is not very high. The invention described above may be modified and adapted in several ways without thereby departing from the scope of the inventive concept. In practice, the materials employed, so long as they are compatible with the specific use, as well as the contingent shapes and dimensions, may be any according to the requirements. All the details may furthermore be replaced with other technically equivalent elements.

Moreover, all details of the invention may be substituted with other technically equivalent elements and the materials used, as well as the shapes and dimensions of the various components, may vary according to requirements.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A particle detection device, including a channel structure arranged for detecting airborne particles in a fluid stream by separation, wherein the channel structure forms a fluid flow passage extending from an inlet to an outlet, and the fluid flow passage comprises a plurality of flow channels arranged between an inlet flow channel connected to the inlet and an outlet flow channel connected to the outlet;
wherein the particle detection device is connectable to a receiving device comprising a pump or fan for enabling a fluid stream to flow through the fluid flow passage of the channel structure;
wherein the inlet flow channel extends from the inlet to a first separation portion arranged for branching off the inlet flow channel into at least one main flow channel and at least one side flow channel, wherein the first separation portion is arranged to separate the fluid stream into a minor flow in the at least one main flow channel and a major flow in the at least one side flow channel, the minor flow in the at least one main flow channel comprises a major portion of particles above a first predetermined size, and the major flow in the at least one side flow channel comprises a minor portion of particles above the first predetermined size;
wherein at least one of the at least one main flow channel or at least one side flow channel comprises one or more detectors arranged for detecting particles; and
wherein the at least one of the plurality of flow channels includes a choked flow restriction configured to provide a choked flow, in use, for enabling a constant flow in the fluid flow passage, independent of pressure conditions.

2. The particle detection device according to claim 1, wherein the choked flow restriction is arranged in the outlet flow channel.

3. The particle detection device according to claim 1, wherein the choked flow restriction comprises a channel constriction having a hydraulic diameter of 50 to 300 micrometer.

4. The particle detection device according to claim 1, further comprising a structure configured to adjust a hydraulic diameter of the choked flow restriction.

5. The particle detection device according to claim 1, wherein the channel structure comprises at least one further separation portion downstream of the first separation portion, wherein the further separation portion is arranged for branching off the at least one main flow channel of the first separation portion or a channel connected thereto into at least one further main flow channel and at least one further side flow channel,
wherein the further separation portion is arranged to separate the fluid stream into a minor flow in the at least one further main flow channel and a major flow in the at least one further side flow channel, the minor flow in the at least one further main flow channel comprising a major portion of particles above a second predetermined size, and the major flow in the at least one further side flow channel comprising a minor portion of particles above the second predetermined size,
wherein at least one of the at least one further main flow channel or at least one further side flow channel comprises one or more detectors arranged for detecting particles.

6. The particle detection device according to claim 1, wherein the one or more detectors comprise an interdigitated capacitive sensor.

7. The particle detection device according to claim 1, wherein a guiding element is positioned at a detector location to guide particles towards the detector.

8. The particle detection device according to claim 7, wherein the guiding element comprises a protuberance having a height of 0.1 to 0.7 times a flow channel height.

9. The particle detection device according to claim 1, wherein the particle detection device is connected to a receiving device comprising a pump or fan for inducing a fluid stream through the fluid flow passage of the channel structure.

10. The particle detection device according to claim 9, wherein the channel structure is removably connected to the receiving device.

11. The particle detection device according to claim 1, wherein at least a part of the channel structure is manufactured by additive manufacturing or 3D printing.

12. The particle detection device according to claim 1, wherein at least a portion of the one or more detectors is coated with a responsive coating arranged to react to a presence of gases so as to facilitate measuring a concentration of gases.

13. A particle detection system comprising:
one or more particle detection devices, wherein ones of the particle detection devices include:
a channel structure arranged for detecting airborne particles in a fluid stream by separation, wherein the channel structure forms a fluid flow passage extending from an inlet to an outlet, and the fluid flow passage comprises a plurality of flow channels arranged between an inlet flow channel connected to the inlet and an outlet flow channel connected to the outlet;
wherein the particle detection device is connectable to a receiving device comprising a pump or fan for enabling a fluid stream to flow through the fluid flow passage of the channel structure;
wherein the inlet flow channel extends from the inlet to a first separation portion arranged for branching off the inlet flow channel into at least one main flow channel and at least one side flow channel, wherein the first separation portion is arranged to separate the fluid stream into a minor flow in the at least one main flow channel and a major flow in the at least one side flow channel, the minor flow in the at least one main flow channel comprises a major portion of particles above a first predetermined size, and the major flow in the at least one side flow channel comprises a minor portion of particles above the first predetermined size;
wherein at least one of the at least one main flow channel or at least one side flow channel comprises one or more detectors arranged for detecting particles; and
wherein the at least one of the plurality of flow channels includes a choked flow restriction configured to provide a choked flow, in use, for enabling a constant flow in the fluid flow passage, independent of pressure conditions; and
a reading device, wherein the one or more particle detection devices are removably connected to the reading device.

14. A method for detecting airborne particles in a fluid stream by separation obtained by using a channel structure forming a fluid flow passage extending from an inlet to an outlet, and the fluid flow passage comprises a plurality of flow channels arranged between an inlet flow channel connected to the inlet and the outlet flow channel connected to the outlet, wherein the channel structure is connectable to a receiving device comprising a pump or fan for enabling a fluid stream to flow through the fluid flow passage of the channel structure; method comprising:
- providing a first separation portion for branching off the inlet flow channel into at least one main flow channel and at least one side flow channel such as to separate the fluid stream into a minor flow in the at least one main flow channel and a major flow in the at least one side flow channel, the minor flow in the at least one main flow channel comprises a major portion of particles above a first predetermined size, and the major flow in the at least one side flow channel comprises a minor portion of particles above the first predetermined size;
- providing one or more detectors in at least one of the at least one main flow channel or at least one side flow channel for detecting particles; and
- providing in the at least one of the plurality of flow channels a choked flow restriction arranged to provide a choked flow, in use, for enabling a constant flow independent of pressure conditions.

15. The method according to claim 14, wherein the hydraulic diameter of the choked flow restriction is selected on the basis of to be detected particles.

16. The particle detection system according to claim 13, wherein the choked flow restriction, of the at least one of the plurality of flow channels, is arranged in the outlet flow channel.

17. The particle detection system according to claim 13, wherein the choked flow restriction, of the at least one of the plurality of flow channels, comprises a channel constriction having a hydraulic diameter of 50 to 300 micrometer.

18. The particle detection system according to claim 13, further comprising a structure configured to adjust a hydraulic diameter of the choked flow restriction, of the at least one of the plurality of flow channels.

19. The particle detection system according to claim 13, wherein the channel structure, of the at least one of the plurality of flow channels, comprises at least one further separation portion downstream of the first separation portion, wherein the further separation portion is arranged for branching off the at least one main flow channel of the first separation portion or a channel connected thereto into at least one further main flow channel and at least one further side flow channel,
- wherein the further separation portion is arranged to separate the fluid stream into a minor flow in the at least one further main flow channel and a major flow in the at least one further side flow channel, the minor flow in the at least one further main flow channel comprising a major portion of particles above a second predetermined size, and the major flow in the at least one further side flow channel comprising a minor portion of particles above the second predetermined size,
- wherein at least one of the at least one further main flow channel or at least one further side flow channel comprises one or more detectors arranged for detecting particles.

20. The particle detection system according to claim 13, wherein the one or more detectors comprise an interdigitated capacitive sensor.

* * * * *